April 17, 1945.    W. L. COOP    2,373,812
TORQUE THUMB SCREW
Filed Feb. 14, 1944

INVENTOR:
W. L. COOP
BY O. O. Martin
ATTORNEY.

Patented Apr. 17, 1945

2,373,812

UNITED STATES PATENT OFFICE 2,373,812

TORQUE THUMBSCREW

William L. Coop, Hawthorne, Calif.

Application February 14, 1944, Serial No. 522,220

6 Claims. (Cl. 85—9)

The present invention relates to screws, such as are employed on jigs, fixtures and the like for applying pressure to maintain parts to be machined in proper position therein during machining operations.

The difficulty generally encountered in applying such devices to parts to be machined is that no means is present for determining the proper pressure to apply. The result is that, in the endeavor to maintain parts firmly in position within such jigs and fixtures, far too much pressure is applied, enough materially to distort the parts which, when the pressure is relieved to permit the parts to return to their normal condition, fail to pass inspection and frequently are wasted.

In view of the foregoing, it is the object of my invention to provide a simple and inexpensive part locating device capable of applying a predetermined amount of pressure to parts to be machined. Such device is illustrated in the accompanying drawing and the principle of its operation is fully explained in the following detailed description.

Figure 1:
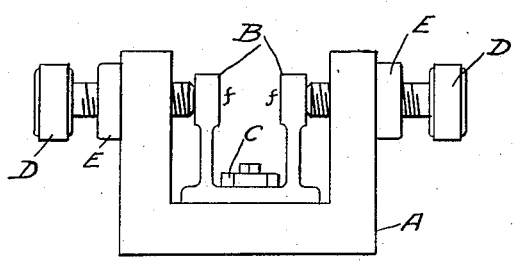
Fig. 1 shows the devices of the invention as applied to locate a part within a simple milling fixture.

In order to simplify this description and so as to clearly illustrate the uses and purposes of the invention, I have, in Fig. 1, shown screws of my invention as applied to a simple form of milling fixture A, for supporting in proper position an object B, which is to be moved past a milling cutter to machine the surfaces marked $f, f$. The object B is locked in position therein by a suitable clamp C. Screws D are thereupon advanced against the sides of the object to be machined to prevent spreading thereof during the milling operation, and check nuts E are then tied down to prevent loosening of the screws due to vibrations.

It is common practice to employ polygonal head screws and to apply a wrench thereto in order to make sure that the screws are tightly seated. Frequently, however, as in the case of the present illustration, it is found that the object to be machined becomes distorted under the uncontrolled pressure of the tightened screws, only to spring back into their original shape when again released therefrom. The result, in the present illustration, is that the distance between the milled surfaces becomes too great and the object spoiled. It has been my experience that, no matter how careful the mechanic may be, the loss due to variations in the finished product is considerable. This brought me to the conclusion that, if some means could be devised for controlling the pressure of the screws against the objects to be machined, great savings might be effected.

In studying this problem, I have found that very little pressure is required. In order to determine this, my first step was to employ a knurled head thumb screw, to which the wrench could not be applied, and I found that even the pressure obtained by finger manipulation was too great. The next step was to ascertain what would be the proper pressure, and careful tests showed from ten to twenty pounds pressure to give the best results. After much experimenting, I have developed the pressure controlling device, or torque screw illustrated in the drawing. The shank of this screw remains unchanged, but the head thereof, designated by the numeral 1, is cylindrical, and a cylindrical perforation 2 is made through the center thereof.

An annular member 3, which for convenience may be termed a ratchet knob, is fitted to rotate on this cylindrical head, and it is noticed that a notch 4 is made in the inner wall of the knob, of a size to receive a ball 5. A spring is placed within the perforation 2, yieldingly to maintain the ball seated in this notch. Where the screw is made with right hand threads for clockwise tightening rotation, as indicated, the left side wall 6 of the notch is cut back to form an inclined runway for the ball.

In operation, the knob 3 is rotated to press the end of the screw against the object to be machined, and this movement is continued so long as the tension of the spring remains sufficient to maintain the ball seated in the notch. But as the pressure against the end of the screw reaches a predetermined degree, it is found that the spring commences to yield, permitting the knob to slip and turn on the screw head 1 and the ball to roll along the inclined runway, gradually to recede into the perforation 2, and finally to roll along the inner wall of the knob. The operator feels the resistance to the manual rotation suddenly breaking down and knows that further rotation is useless. He may then tighten down the checknut to maintain the screw in set position, In order to reduce friction and also to protect the rear end of the spring, I have placed a second ball 5 behind the latter, as indicated in Fig. 3.

Two factors determine the pressure developed by rotation of the ratchet knob. One is the tension of the spring, the other the angular slope of the runway, both of which can be accurately calculated in modern manufacturing practice and, when uniformly maintained, will deliver substantially the exact pressure the device is designed to produce.

Figure 2:
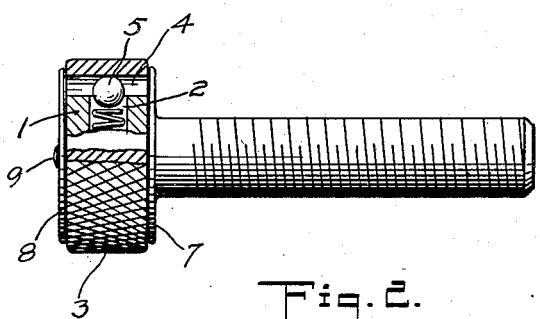
Fig. 2 illustrates the device per se and partly in section.
Figure 3:
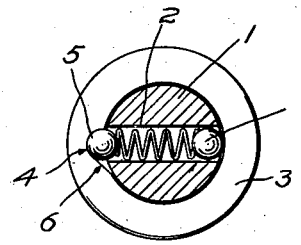
Fig. 3 is an end view of the device with parts thereof broken away.
Figure 4:
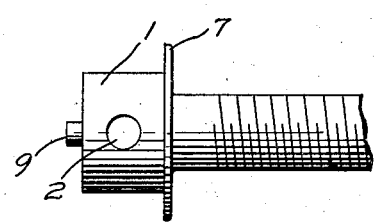
Fig. 4 is a fragmentary view showing the inner portion of Fig. 2.
Figure 5:
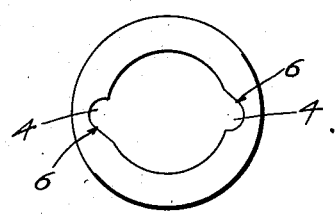
Fig. 5 illustrates a slightly modified part of the device.

While in Fig. 3 only one notch 4 is shown, it may be preferred by some to provide a plurality of notches, as indicated in Fig. 5. This arrangement has certain advantages, but is subject to the difficulty and expense of making all the notches perfectly symmetrical in shape and position. If one notch is the slightest bit deeper or larger than the others, a decided pressure variation will occur, one notch delivering perhaps five to ten pounds more pressure than the others. For this reason, I prefer to employ the much more economical arrangement of the single notch.

It is, of course, necessary to maintain the knob axially in position on the screw head. The latter is, to this end, shown made with a thin flange 7, against which the knob comes to rest when first applied to the screw. A thin cover plate 9 is thereupon suitably fastened to the end of the screw head. The latter is for this purpose made with a tit 9, which engages a central perforation of the plate, and a few taps of a hammer suffices to rivet the cover firmly in position.

It is to be understood that the foregoing merely demonstrates the principle of operation of the invention; that my torque screw may be employed in connection with other fixtures or jigs, as for example to replace the usual spring jack for supporting against drill pressure in jigs and fixtures, or may be used wherever it can be applied to exert controlled pressure; and that I reserve the right to embody in the device further modifications within the scope of the claims hereto appended.

I claim:

1. A torque screw having a head manually rotatable to press the screw against an object, said head comprising a cylindrical inner member integral with the screw, an annular outer member fitted to rotate on said inner member and having a notch in its inner wall, an element seated in said notch, and means within the inner member yieldingly maintaining said element in position within the notch thereby to maintain the two members interlocked during rotation of the outer member until predetermined pressure resistance is encountered, continued rotation causing said element to recede from the notch into the inner member and the outer member to rotate freely thereon.

2. A torque screw having a head manually rotatable to press the screw against an object, said head comprising a cylindrical inner member integral with the screw, an annular outer member fitted to rotate on said inner member and having a notch in its inner wall, a ball seated in said notch, and a spring within the inner member yieldingly maintaining said ball in position within the notch thereby to maintain the two members interlocked during rotation of the outer member until predetermined pressure resistance is encountered, continued rotation causing the ball to recede from the notch into the inner member and the outer member to rotate freely thereon.

3. A torque screw having a head for manual rotation to press the screw against an object, said head comprising, a cylindrical inner member integral with the screw and having a perforation transversely extending therethrough, a resilient element seated in said perforation, an annular outer member fitted to rotate on said inner member and having a notch in its inner wall, means seated in said notch and engaging said resilient element to maintain the members interlocked during rotation of the outer member until predetermined pressure resistance is encountered, continued rotation causing said means to recede into said perforation against the tension of said resilient element and freeing the outer member for independent rotation.

4. A torque screw comprising, a cylindrical inner member integral with the screw shank, resilient means transversely seated in said inner member, an annular outer member fitted to rotate on said inner member and having a notch in its inner wall, an element seated in said notch and engaging said resilient means to maintain the members interlocked during rotation of the outer member until predetermined pressure resistance is encountered, continued rotation causing said element to recede from the notch against the tension of said resilient means to release the outer member for independent rotation, and means maintaining the outer member axially in position on the inner member.

5. A torque screw the head of which comprises, an inner member integral with the screw shank and having a transverse perforation therethrough, an outer member fitted to rotate on said inner member, said outer member having an internal axial groove, a spring seated in said perforation, and elements at the ends of said spring for engagement with said groove to interlock the two members during rotation of the outer member until predetermined pressure resistance is encountered to cause the element seated in the groove to recede into said perforation and so to release the outer member for independent rotation.

6. A torque screw the head of which comprises, an inner member integral with the screw shank and having a transverse perforation therethrough, an outer member fitted to rotate on said inner member, said outer member having internal axial grooves, a spring seated in said perforation, and elements at the ends of said spring for engagement with said grooves to interlock the members during rotation of the outer member until predetermined pressure resistance is encountered to cause the elements to recede from the grooves into said perforation against the tension of said spring thereby to unlock the outer member.

WILLIAM L. COOP.